March 3, 1931. J. W. MEADOWCROFT 1,794,789
ELECTRIC WELDING APPARATUS
Filed Aug. 15, 1925

INVENTOR.
JOSEPH W. MEADOWCROFT
BY
ATTORNEY.

Patented Mar. 3, 1931

1,794,789

UNITED STATES PATENT OFFICE

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA

ELECTRIC-WELDING APPARATUS

Application filed August 15, 1925. Serial No. 50,375.

This invention relates to improvements in electric spot welding machines in general and more particularly to improvements in the relative arrangement and disposition of the cooperating welding rods and holders therefor.

In the field of welding it is usually the practice to provide a welding machine for performing a particular class of work. However, machines limited in this manner to do work of a single character are inefficient for the reason that their range of utility is too low so that they seldom operate at or nearly at their maximum capacity. Accordingly it has long been the aim of those skilled in the art of welding, especially in that branch of it which relates to the welding of automobile body parts, to construct a machine such that it is adapted to perform a variety of different operations. For instance, in the manufacture of automobile body parts, it has been necessary heretofore when the operator wished to weld two or more pieces of metal together at points which required an offset electrode or an electrode of some other peculiar shape either to change the set-up of the machine by substituting the offset electrode for the straight electrode or to make these welds on a special machine equipped with such offset electrode. The first course requires considerable time and money, both of which are expensive. The latter course requires a transfer of the work from one machine to another, which is undesirable in that it slows up considerably the operations.

In order to obviate the above mentioned objections this invention contemplates the use of more than one set of cooperating electrodes such that a single welding machine may be used to perform welding operations upon jointed articles of different character without involving the necessity of changing the set-up. Accordingly, the primary object of this invention is the provision of holders for the electrodes or dies such as are adapted to increase the range of utility of the welding machine while at the same time they perform the work more conveniently and efficiently.

A further object of this invention is the provision of holders of a particular type that during the operation of the machine those cooperating electrodes which are not doing any of the welding work will yet not interfere in any manner with those which are.

A still further object of this invention is the provision of holders for the electrode points or dies adapted to adjustably receive various types of electrodes whereby it is possible to relatively adjust the cooperating electrodes of the several sets such that when one set is performing its welding operation upon the work the other set will be inoperative.

A still further object is the provision of means for circulating a cooling fluid through the several electrodes. Other objects of the invention will appear more fully hereinafter. The invention consists of substantially the structure, combination and location of parts all as will be more fully hereinafter set forth, as shown in the accompanying drawings and finally pointed out in the appended claims.

In the accompanying drawings—

Figure 1:
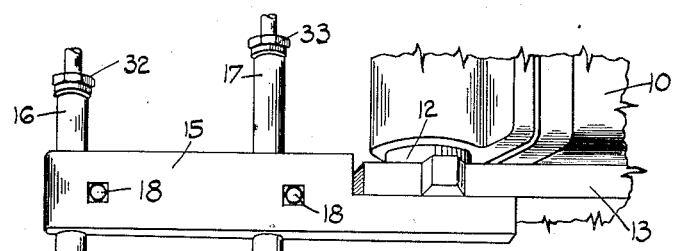
Figure 1 is a view in perspective showing the electrode holders mounted on the ends of the parallel arms of a welding machine, the latter not being shown.

In general, this invention contemplates the establishment of a plurality of independent welding axes lying in substantially the same vertical plane. In place of the single electrode ordinarily fixed to each of the welding arms, a pair of spaced apart electrodes are so fixed to each arm that each electrode of the upper pair is in substantially vertical alignment with an electrode of the lower pair. The electrodes comprising the foremost outer welding set are arranged much as usual, but those constituting the rearmost or inner welding set are arranged somewhat differently.

In the first place the outer set of cooperating electrodes are preferably arranged to contact with the work at a point disposed between the arms of the machine, whereas the inner set are arranged to contact with the work at a point below the lower arm of the machine. Such an arrangement provides a pair of welding centers adapted to different kinds of work, and means have been devised whereby all interference of one set with the other is precluded. Preferably it is proposed to provide an aperture or an offset in the lower arm through which one of the upper electrodes is permitted to project into work engaging position beneath said arm. Further, it is proposed to adjustably mount the upper electrodes on their common support whereby they can be changed or renewed if worn out and whereby the two sets may be so adjusted that the distances between the separate pairs of welding dies are always the same so that when the work is disposed between one set of electrodes the other set will be held apart a distance equal to the thickness of the work to prevent any possibility of affording a by-pass for the current around the work to be welded.

Referring now to the drawings in which like reference numerals designate similar parts throughout the description, 10 and 11 represent respectively the upper and lower arms of a welding machine (not shown), these arms being arranged such that they are relatively vertically adjustable toward and away from each other.

The arm 10 is provided at its forward end with a vertically movable ram or plunger 12 which is reciprocated by any suitable means (not shown). Secured to the lower end of this ram 12 is a supplemental arm 13 to which the ram 12 imparts an upward and downward movement. Secured to the lower face of the supplemental arm 13 preferably by means of bolts, though it is contemplated that any other securing means may be used, is the upper electrode holder 15. This holder is mounted in such manner that the major portion of its body projects forwardly from the arm 10. Carried by this electrode holder 15 are two electrodes 16 and 17, the electrode 16 being mounted at the extreme forward end of the holder 15 while the electrode 17 is mounted at a point intermediate the electrode 16 and the rear end of the holder 15. Suitable clamping means 18—18 are provided for securely locking the electrodes 16 and 17 in adjusted position in their holder 15. It will be noticed that the electrode 16 is of considerably shorter length than the electrode 17 and that both electrodes are provided with lower points or horns 19 having portions relatively offset from the main body thereof. These particular types of electrodes shown are for purposes of illustration mainly, it being understood, of course, that other electrodes of particular design, depending upon the character of the work to be welded, may be used in their stead.

Figure 2:
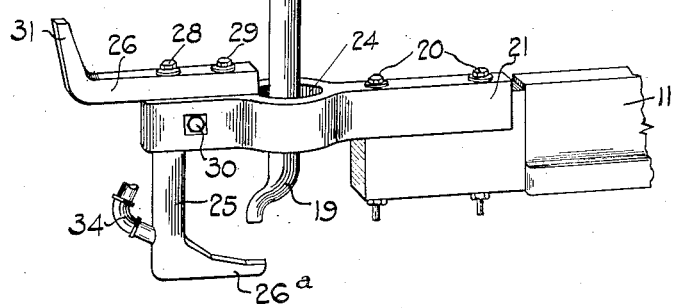
Fig. 2 is a plan view of the holder attachment for the lower set of electrodes.
Figure 3:
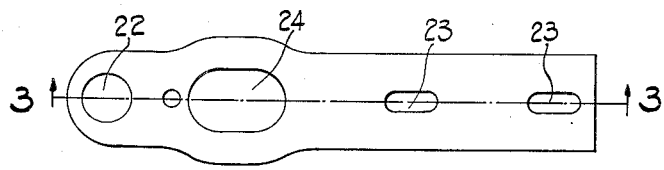
Fig. 3 is a longitudinal section through the attachment along lines 3—3 of Fig. 2.

Secured to the lower arm 11 of the welding machine, preferably by bolts 20, is the lower electrode holder 21. In a manner similar to that of the upper holder 15, this lower holder is adapted to project forwardly of the arm 11. As is best shown in Figs. 2 and 3 this holder 11 is provided at its extreme forward end with an electrode receiving aperture 22 and at its opposite end with elongated slots 23 for reception of the bolts 20. It will be seen that by virtue of the provision of these slots 23 the holder 21 may be adjusted longitudinally toward or away from the arm 11. Intermediate the aperture 22 and the slots 23 is provided a relatively large elongated opening 24 for a purpose to be described immediately hereinafter.

The lower electrodes 25 and 26 are secured to the forward end of the holder 21 as is best shown in Fig. 1. The electrode 25 has a rearwardly extending foot portion 26ᵃ, the free end of which is adapted to be in alignment with the point 19 of the electrode 17. The upper end of the electrode 25 is preferably provided with an interiorly threaded socket 27 for reception of the lower end of the stud bolt 28 whereby the electrodes 25 and 26 are securely fastened together on the holder 21. An additional bolt 29 may be provided to prevent lateral displacement of the electrode 26. The forward end of the electrode 26 is turned upwardly to present a point 31 in alignment with the point 19 of the electrode 16. As is the case of the upper electrodes the electrode 25 is securely locked in adjusted position by the clamping bolt 30 or by any other suitable means. Also as with the upper electrodes the lower electrodes 25 and 26 may be removed and other substituted in their place. For instance, a certain class of work might require that the outer set of electrodes be of the straight simple contacting type while the inner set be of the inwardly projecting offset type. In such case the electrode 17 is turned through an angle of 180° so that its offset portion 19 faces in the opposite direction from that shown in Fig. 1. Such a change necessitates, of course, a corresponding change in the lower electrode 25 in that a larger foot 26ᵃ should be used. A change such as has been described provides an increased clearance between the welding axis and the shank of the lower electrode.

When the several elements have been arranged as has just been described it will be seen that there has been provided two sets of cooperating electrodes, one set including the electrodes 16 and 26 and the other set including the electrodes 17 and 25. By reason of the provision of the aperture 24 in the lower holder 21 the electrode 17 is adapted to move vertically into contacting position with the work positioned for welding between the points 19 and 26ᵃ. Should it be found necessary to more properly vertically align the several pairs of electrodes this may be readily done by loosening the bolts 20 and sliding the holder 21 longitudinally in one direction or the other within the limits of the slots 23.

By means of the clamps 18 on the upper holder the electrodes 16 and 17 may be vertically adjusted with respect to the lower electrodes 25 and 26 such that the distances between the coacting points in each set are exactly the same. When this latter adjustment is had it will be seen that when the electrodes 16 and 26 are in operating position upon a certain class of work the electrodes 17 and 25 will be spaced apart a distance equal to the thickness of the work operated upon and conversely when the work operated upon is of a nature such as should be operated upon by the electrodes 17 and 25 then the electrodes 16 and 26 are maintained in separated position. It will thus be seen that the arrangement is such that only one set of electrodes at any time is effective to close the secondary circuit.

The welding electrodes shown in the drawing are preferably made of copper throughout and are of the water cooled type. As has already been described the upper electrodes are each provided with removable points 19 so that when these points become worn out from use they may be easily replaced by new points. The electrodes 16 and 17 are provided at their upper ends with water connections 32, 33, respectively, for supplying a cooling fluid directly to the point 19. In like manner the lower electrode 25 is provided with a water connection 34 for cooling the electrode point 26ᵃ. These water connections 32, 33 and 34 may be separately connected with a source of water supply or they may be connected in series with each other to form part of a continuous circulating system.

Figure 4:
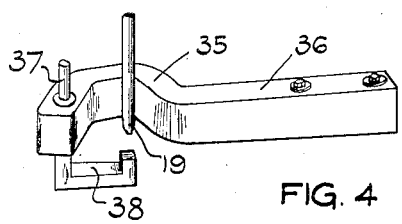
Fig. 4 is a modified form of the invention showing an alternative arrangement for permitting freedom of operation of both sets of electrodes free from relative interference.

In Fig. 4 there is shown a modification of the invention in so far as the lower electrode holder has been modified. Instead of providing the aperture 24 as shown in Figs. 1, 2 and 3, through which the upper electrode 17 passes, in Fig. 4 is shown an offset portion 35 at the free end of the holder 36. This substantially semi-circular offset portion 35 allows for the passage therethrough of an upper electrode similar to that shown in connection with the modification of Figs. 1, 2 and 3. At the extreme end of the portion 35 are mounted the lower electrodes 37 and 38 which are adapted to coact with the electrodes 16 and 17 carried by the upper holder. In all other respects this modified form of the lower electrode holder is exactly like that form which has been described above.

It is realized that the particular embodiments of this invention which have been here shown and described are susceptible of various changes and modifications without departing from the spirit thereof and therefore it is desired to claim the invention broadly as indicated by the appended claims.

What I claim as new and useful is:

1. An electric welding machine comprising a pair of relatively movable arms, an electrode holder secured to each arm, and a plurality of electrodes carried by each of said holders whereby corresponding electrodes on said holders constitute welding sets operating on the work in separate welding planes.

2. An electric welding machine comprising a pair of relatively movable arms, a plurality of electrodes having their welding points offset and carried by one of said arms, and a plurality of spaced apart electrodes carried by the other of said arms and cooperating with said first named electrodes whereby to effect a plurality of welding sets operating on the work along separate fixed welding axes and in different welding planes.

3. An electric welding machine comprising a pair of relatively movable arms, an electrode secured at the outer end of one of said arms, a second electrode also secured to said arm but spaced from said first mentioned electrode, and a plurality of electrodes spaced laterally from each other in different horizontal planes carried on the other of said arms, said last mentioned electrodes having welding points corresponding to the points of said first mentioned electrodes to effect a plurality of welding sets operable along spaced parallel welding axes in different horizontal planes.

4. An electric welding machine comprising a fixed electrode holder, a relatively movable electrode holder, said holders being in substantially vertical alignment, a plurality of spaced electrodes carried by said movable holder, a pair of corresponding electrodes carried by said fixed holder adapted to contact with said first named electrodes in different planes, and means for effectually precluding any interference by one set of electrodes with the operation of another set.

5. An electric welding machine comprising a pair of relatively movable arms, a pair of upper electrodes carried by one of said arms, one of said electrodes terminating intermediate said arms, and the other of said electrodes terminating beyond the arm other than that upon which it is mounted, and a pair of lower electrodes mounted on said other arm and presenting welding points for coaction with the welding points of said upper electrodes whereby to effect relatively offset welding centers.

6. An electric welding machine comprising upper and lower welding arms, one of said arms being provided with an aperture having the axis thereof extending through the other of said arms, a plurality of electrodes carried by said last mentioned arm, one of said electrodes being mounted at the extreme forward end of said arm and the other of said electrodes being mounted coincidently with the axis of said aperture and extending through said aperture, and a pair of relatively offset electrode points mounted on said apertured arm whereby to effect offset welding centers above and below said apertured arm.

7. An electric welding machine comprising a pair of relatively movable arms, a carrier for a plurality of electrodes securely mounted on one of said arms and having the main body portion thereof extending forwardly of said arm, a plurality of electrodes of different lengths carried by said carrier, an apertured carrier mounted on the other of said arms and having the main body portion thereof extending forwardly in vertical alignment with said first mentioned carrier, the aperture in said second carrier permitting the projection therethrough of the longer of said first mentioned electrodes.

8. An electric welding machine comprising an upper electrode carrier carrying a plurality of spaced electrodes, a lower electrode carrier carrying a corresponding number of electrodes at the forward end thereof, said lower carrier being provided with means to permit passage therethrough of one of the upper electrodes into engagement with its corresponding lower electrode.

9. In an electric welding machine comprising a fixed electrode carrier carrying a plurality of electrodes having the welding points thereof relatively offset, a second electrode carrier adapted for reciprocatory movement toward and away from said fixed electrode carrier, said reciprocable electrode carrier carrying a plurality of spaced electrodes corresponding to the fixed electrodes, and means provided in said fixed carrier effective to establish welding centers above and below said fixed carrier, respectively.

10. In an electric welding machine comprising a pair of relatively movable arms, a carrier for a plurality of electrodes secured to each of said arms, one of said carriers carrying a pair of spaced substantially parallel electrodes, the other of said carriers carrying forwardly and upwardly extending and rearwardly and downwardly extending electrodes secured at the forward end thereof for coaction with said first mentioned electrodes, said latter carrier being provided with means substantially above the welding point of said rearwardly extending electrode to permit passage therethrough of one of said spaced electrodes into cooperating position with said welding point.

11. An electric welding machine comprising an upper carrier for a plurality of spaced apart electrodes, a lower carrier for a corresponding number of electrodes, one of said lower electrodes extending forwardly and upwardly for coaction with one of said upper electrodes and the other of said lower electrodes extending downwardly and rearwardly for coaction with the other of said upper electrodes, and means in said lower carrier for permitting passage therethrough of said last mentioned upper electrode.

12. An electric welding machine comprising a pair of relatively movable arms, an upper electrode carrier secured to one of said arms, means for clamping a plurality of electrodes in adjusted position on said upper carrier, a lower carrier secured to said lower arm, said lower arm being provided with elongated slots to permit longitudinal adjustment thereof and said lower carrier being further provided with an aperture intermediate its forward end and point of securement to the lower arm whereby to allow free passage therethrough of one of the upper electrodes.

13. An electric welding machine comprising a plurality of sets of welding electrodes, the welding axes of said sets being arranged laterally and in substantially the same vertical plane, one of said sets of cooperating electrodes having its welding center disposed forwardly of the welding machine and the other of said sets of cooperating electrodes having its welding center disposed substantially toward the rear and below said first mentioned welding center.

14. An electric spot welding machine comprising a plurality of pairs of relatively reciprocating electrodes, said pairs of electrodes, being spaced from one another horizontally and vertically and having their welding axes parallel.

15. An electric welding machine comprising a pair of relatively movable arms, an electrode carrier secured to each arm, and a plurality of cooperating electrodes mounted on each of said carriers, said electrodes being arranged to form a plurality of cooperating pairs thereof which lie in different horizontal planes and are laterally spaced one from the other.

16. An electric welding machine comprising a plurality of pairs of cooperating electrodes adapted to operate singly and separately upon different pieces of work in different planes, and means maintaining the electrodes of the idle pairs separated a distance substantially equal to the thickness of the work between the operating pair, whereby the secondary circuit is closed by one pair of cooperating electrodes at a time.

In testimony whereof, I hereunto affix my signature.

JOSEPH W. MEADOWCROFT.